Aug. 15, 1967 G. W. BLOOMQUIST 3,336,057
BEARING ASSEMBLY
Filed Oct. 23, 1964 2 Sheets-Sheet 1
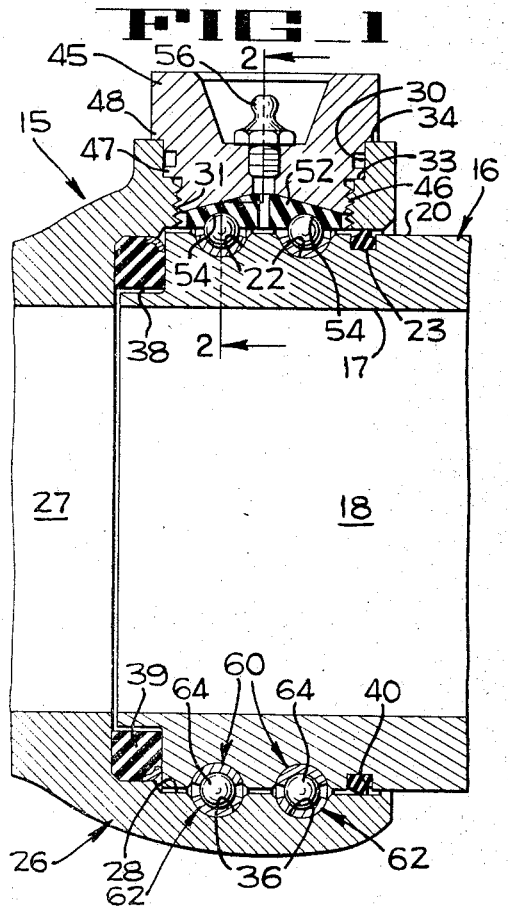
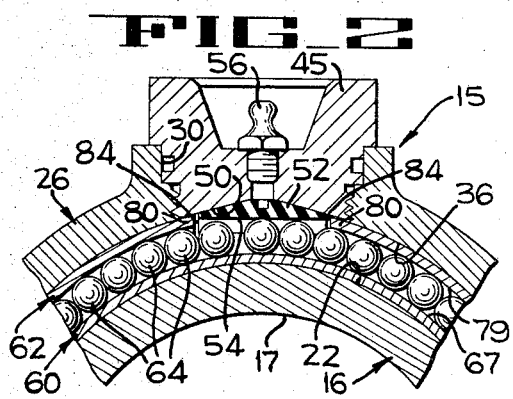
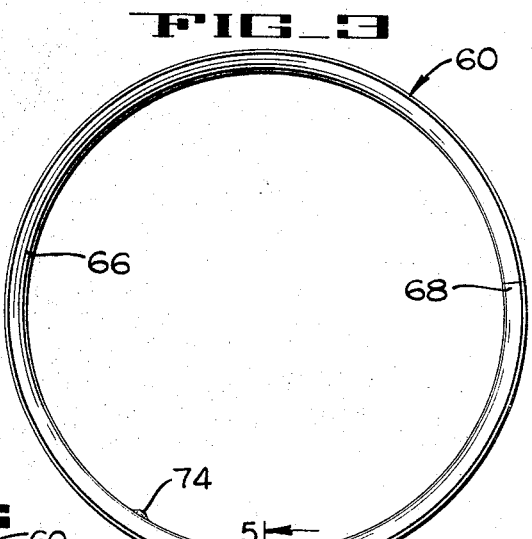
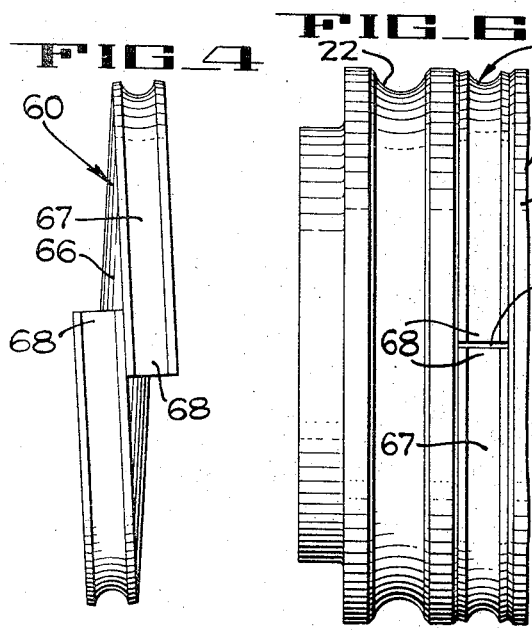
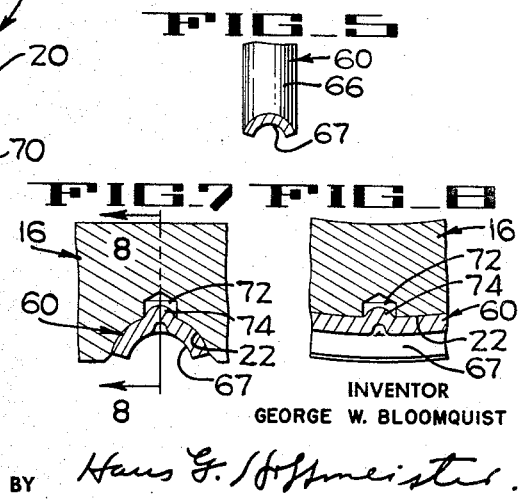
INVENTOR
GEORGE W. BLOOMQUIST
BY Hans G. Hoffmeister.
ATTORNEY Aug. 15, 1967  G. W. BLOOMQUIST  3,336,057
BEARING ASSEMBLY
Filed Oct. 23, 1964  2 Sheets-Sheet 2
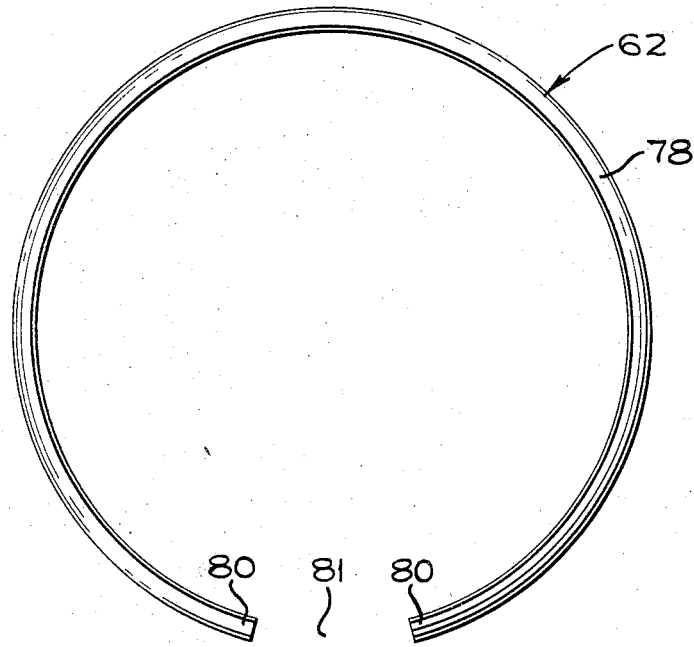
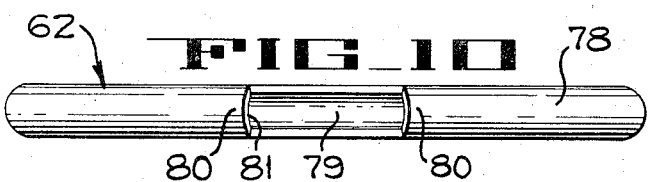
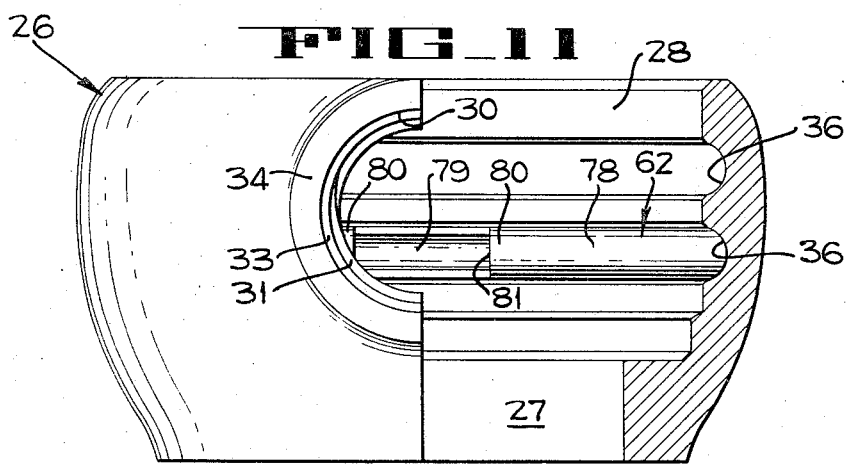
INVENTOR
GEORGE W. BLOOMQUIST
BY Hans G. Hoffmeister
ATTORNEY

United States Patent Office 3,336,057
Patented Aug. 15, 1967

3,336,057
BEARING ASSEMBLY
George W. Bloomquist, Long Beach, Calif., assignor to FMC Corporation, San Jose, Calif., a corporation of Delaware
Filed Oct. 23, 1964, Ser. No. 405,935
5 Claims. (Cl. 285—276)

The present invention pertains to a bearing assembly and more particularly to a bearing assembly which can accommodate temperature changes without affecting its operation.

The bearing assembly of the present invention is particularly suited for use in a swivel pipe joint and was developed in order to solve certain problems existing with prior bearing assemblies as used in such joints. As is known, a swivel pipe joint includes interfitted male and female members rotatably interconnected by a bearing assembly. This assembly has inner and outer races respectively incorporated in the male and female members of the joint and a plurality of balls between these races.

In the past, ball races for swivel pipe joints have generally been formed in one of two ways. First, hardened ball races have been made by casting steel rings individually into the male and female members of the joint. These rings have been machined and heat treated while remaining as parts of the male and female members. This method is relatively expensive and only certain materials can be used in combination in such a manner. Secondly, ball races have been made by pre-machining the races and thereafter securing them to the male and female members by screw threads, pins or the like. If metals with different temperature coefficients are used for the races and male and female members, races secured in this way loosen or sometimes break when the joint is subjected to certain temperature changes.

It is an object of the present invention to provide an improved bearing assembly.

Another object is to provide a bearing assembly which is unaffected in operation by expansion and contraction due to temperature changes.

Another object is to provide a bearing assembly having particular utility in a swivel pipe joint.

Another object is to provide a bearing assembly for a rotary joint wherein different metals can be selected for the male and female members of the joint and for the bearing assembly, according to their individual requirements, while retaining satisfactory operation of the bearing assembly under temperature changes.

Another object is to provide insert races for the male and female members of a rotary joint which races do not become loose or break but remain tightly in engagement with their respective members during expansion and contraction of the joint.

Another object is to provide an economical bearing assembly including races which may be independently removed and replaced when worn or damaged.

These, together with other objects, will become apparent upon reference to the following description and accompanying drawings, in which:

FIGURE 1 is a longitudinal section of a swivel pipe joint incorporating a bearing assembly which embodies the present invention.

FIGURE 2 is a fragmentary transverse section taken on a plane at a position indicated by lines 2—2 in FIG. 1.

FIGURE 3 is a side elevation of an inner race, as used in the subject bearing assembly, shown in diametrically unstressed condition.

FIGURE 4 is an edge view of the inner race shown in FIG. 3.

FIGURE 5 is a fragmentary section taken on line 5—5 in FIG. 3.

FIGURE 6 is a fragmentary side elevation of the male member of the swivel joint of FIG. 1 showing an inner race installed in one of the two grooves of the male member.

FIGURE 7 is an enlarged fragmentary section taken through the male member of the joint and the inner race and showing a socket and detent.

FIGURE 8 is a section taken on a plane at a position indicated by line 8—8 in FIG. 7.

FIGURE 9 is a side elevation of an outer race of the subject bearing assembly, said race being shown in its diametrically unstressed condition.

FIGURE 10 is an edge view of the race shown in FIG. 9.

FIGURE 11 is a view of the female member of the swivel joint shown partly in side elevation and partly in section, and also showing the outer race installed in one of the two grooves of the female member.

Referring more particularly to the drawings, a swivel pipe joint is generally indicated by the numeral 15 in FIG. 1. This joint includes a male conduit member 16 having an internal wall 17 which surrounds a fluid passageway 18. The male member also has a cylindrical external wall 20 in which is provided a pair of inner annular bearing grooves 22 and an annular seal recess 23.

The swivel pipe joint 15 also includes a female conduit member 26 having a fluid passageway 27 aligned with the passageway 18 when the male and female members 16 and 26 are interfitted in the well known manner. The female member includes an internal cylindrical wall 28, circumscribing the external wall 20 of the male member 16, and an access hole 30 extending radially through the internal wall and being provided with threads 31 adjacent to the internal wall and inner and outer shoulders 33 and 34. The internal wall 28 has a pair of outer annular grooves 36 individually circumscribing the inner grooves 22. The interfitted male and female members provide an annular chamber 38 in which is located a main seal 39. An anti-dust ring 40 is located in the recess 23 and is in sealing contact with the internal wall.

A cap 45 is located in the access hole 30 and includes inner threads 46, engaging the threads 31 of the hole, and inner and outer annular flanges 47 and 48 respectively engaging the shoulders 33 and 34 when the cap is threaded tightly in place. The cap has an inner arcuate wall 50 (FIG. 2) which constitutes a continuation of the outer groove 36 of the female member 26 when said flange and shoulders are in engagement. The cap also has a resiliently compressible end portion 52 provided with a pair of substantially straight channels 54 which are disposed inwardly of the inner wall 50. Furthermore, the cap is provided with a grease fitting 56 opening between the channels.

A bearing assembly embodying the present invention includes an inner race 60, an outer race 62, and a plurality of rollable elements such as balls 64. Two bearing assemblies are shown in FIG. 1, although only one is described in detail. The inner race (FIGS. 3–8) is substantially annular, radially split, and resiliently expandable. It has an inner surface 66 of a transverse curvature substantially complementary to the curvature of the inner grooves 22. Further, the inner race has an outwardly directed peripheral raceway 67 and ends 68 which overlap (FIG. 4) in the diametrically unstressed condition of the race. The internal diameter of the inner race, in its unstressed condition, is less than the diameter of the inner grooves 22, this groove diameter being measured diametrically of the male member 16. However, the inner race is resiliently diametrically expandable to make its internal diameter greater than the diameter of the external wall 20 of the male member, whereby the inner race can be passed over the male member and fitted into one of the inner grooves; when the inner race is located around its inner groove, it is allowed to contract whereupon it fits into the groove in constricted engagement about the male member. The circumference of the inner race, when the inner race is fitted in this manner in the inner groove, is predetermined so that an inner gap 70 (FIG. 6) exists between the ends 68 of the inner race; this gap will remain even at the lowest, that is coldest, operating temperature of the swivel joint 15, it being understood, of course, that as the male member 16 expands and contracts, the circumferential dimension of the gap increases and decreases. At all times, the inner race remains constricted about the male member so that the race does not become loose or break under stress or strain.

In order to prevent circumferential creeping of the inner race 60, the male member 16 is provided with a socket 72 (FIGS. 7 and 8) indented radially inward from each inner groove 22. Each inner race has a radially inwardly projecting detent 74 which releasably projects into its associated socket. It is thus evident that when the detent and socket are in registry, any appreciable movement of the inner race, circumferentially of its inner groove 22, is precluded.

The outer race 62 (FIG. 2, 9–11) is also radially split and substantially annular, but is diametrically compressible. The outer race has an outer surface 78 which has a transverse curvature complementary to that of each outer groove 36. Also, the outer race has an inwardly directed raceway 79 and ends 80 which define an outer gap 81 therebetween. It is to be noted that this outer gap has a maximum circumferential dimension when the outer race is in its unstressed condition, as shown in FIG. 9. The external diameter of the outer race in its unstressed condition is greater than the diameter of each outer groove 36 but is resiliently diametrically contractible so that it can be inserted within the internal wall 28 of the female member 26 and fitted in one of the outer grooves whereupon it is allowed to expand into tight frictional engagement with this outer groove. When positioned in the outer groove in this manner (FIG. 11) the female member maintains the outer race in a stressed constricted condition with the circumferential dimension of the gap 81 less than that in the unstressed condition of the outer race. The outer race is positioned in its outer groove so that the outer gap is in substantial registry with the access hole 30. The ends 80 of the outer race underlie (FIG. 2) the inner wall 50 of the cap 45, these ends defining clearance spaces 84 with the end portion 52 of the cap. When the outer race is inserted in this manner, the corresponding channel 54 in the end portion of the cap constitutes a straight segment or continuation of the outer raceway 79. During expansion and contraction of the female member 26, the outer race 62 also expands and contracts with the clearance spaces increasing and decreasing, there being always a minimum clearance space even at the coldest operating temperature of the joint.

The balls 64 of the bearing assembly are inserted between and removed from the raceways 67 and 79 through the access hole 30. When the balls are all in place and the cap 45 is threaded into the hole, the end portion 52 of the cap, being located between the ends 80 of the outer race 62, limits circumferential creeping of the outer race and thus performs a function similar to that performed by the detent 74 and the socket 72 described above.

It is to be noted that the inner and outer races 60 and 62 and the balls 64 are independently insertable and removable, a particular advantage when used in a swivel joint as 15. In other words, when the races and balls are separate from the swivel pipe joint 15, they do not fit together as a unit and therefore do not have to be inserted as a unit. In order to disassemble the joint, the balls are removed and the male and female members 16 and 26 are axially separated whereupon the inner and outer races are accessible for removal and replacement independently of each other.

This independence is also of importance in the operation of the bearing assembly under changes in temperature. Thus, with the bearing assembly installed in the swivel pipe joint 15, as described above and illustrated in FIGS. 1 and 2, let it be assumed that the joint is subjected to such high temperatures that the male and female members expand. Assuming that the material of the male and female members is the same and thus has the same coefficient of expansion, the inner race will be diametrically expanded by the male member the same amount as the outer race is allowed to expand by the female member. Both of the races will remain in tight frictional engagement with their respective joint members, and the same radial distance will remain between the inner and outer raceways 67 and 79. This latter feature is significant since the torque required to rotate the joint is unaffected by such expansion because there is no increase in compressive forces on the balls 64 between races. Similarly, the action of the bearing assembly is unaffected by subjecting the joint to cold whereupon the raceways independently contract by corresponding amounts, remaining in tight frictional engagement with their respective joint members and maintaining the same radial dimension between the raceways. Of course, if the male and female members expand or contract by different amounts, their associated races expand or contract by corresponding amounts because of the described independent construction.

Another advantage of the insert races 60 and 62 is that different materials can be used for the joint members 16 and 26 and the races. For example, Inconel (a high nickel-chromium iron alloy) races can be used with non-ferrous swivel joint members for cryogenic service; hardened steel races can be used with mild steel joint members for better welding and greater moment load capacity; and steel races can be used with non-ferrous (such as bronze, aluminum, plastic, and the like) swivel joint members for chemical service.

From the foregoing, it will be evident that a bearing assembly according to the present invention includes inner and outer races which accommodate to changes in temperature without adversely affecting the operation of the bearing assembly or the rotary joint in which it is used. The races are easily insertable and removable and yet remain firmly and dependably in place without becoming loose or breaking as a result of expansion and contraction. These races enable the use of dissimilar materials for the races and joint members so that the material requirements for each are met. In practice, it has been found that the bearing assembly embodying the present invention is excellently suited for use in a swivel pipe joint.

Although a preferred embodiment of the present invention has been shown and described, it will be understood that various changes and modifications may be made in the details thereof, without departing from the spirit and the scope of the appended claims.

Having thus described the invention, what is new and desired to be secured by Letters Patent is:

1. In a swivel pipe joint including interfitted male and female members respectively provided with outwardly and inwardly directed substantially circumferentially extending grooves, a bearing assembly comprising a radially split resiliently diametrically expandable annular inner race having ends which overlap when the race is diametrically unstressed, said inner race having an inside diameter, when the ends of the race are overlapped, which is less than the diameter of the groove in the male member measured diametrically of the male member; a radially split resiliently diametrically contractible annular outer race having ends which define a gap having a predetermined length, the outer diameter of the outer race, when the ends thereof are spaced said predetermined length apart, being greater than the diameter of the groove in the female member measured diametrically of the female member, said female member having an access hole communicating with its groove, said inner race being releasably fitted in the groove in the male member in substantially circumscribing relation to said male member and in constrictive engagement therewith and so that a gap is provided between the ends of the inner race, said outer race being releasably fitted in the groove in the female member so as to be constricted by the female member with the gap in the outer race in registry with said access hole and with said gap in the outer race being shorter than said predetermined length, and balls rollably positioned between said inner and outer races and being movable into and out of their positions between said races through the gap in the outer race and said access hole, said female member including a cap connected in said hole, said cap having a wall overlying the ends of the outer race, said cap also having an end projecting between the ends of the outer race in spaced relation to said ends, the end of the cap also providing a channel which constitutes a continuation of the outer race, said inner and outer races being thereby respectively in tension and compression whereby upon expansion and contraction of the male and female member of the joint under temperature changes, said races expand and contract but still remain in their constricted conditions in substantially the same radially spaced relation to each other to facilitate continued rollable movement of the balls between the races.

2. The bearing assembly of claim 1 including means for limiting movement of the inner race circumferentially of the male member, said end of the cap limiting movement of the outer race circumferentially of the female member.

3. A bearing assembly for a rotary joint including interfitted male and female members respectively provided with outwardly and inwardly facing substantially circumferentially extending grooves and said female member provided with an access hole communicating with its groove, said assembly comprising a radially split resiliently diametrically expandable annular inner race with ends that overlap when the race is diametrically unstressed, said inner race having an inside diameter, when the ends thereof are overlapped, less than the diameter of the groove in the male member measured diametrically of the male member, said inner race adapted to releasably and constrictably fit in the groove in the male member with a gap between said ends; a radially split resiliently diametrically contractible annular outer race with ends that define a gap having a predetermined length, said outer race having an outside diameter, when its ends are spaced said predetermined length apart, greater than the diameter of the groove in the female member as measured diametrically of the female member, said female member having an access hole communicating with its groove, said outer race adapted to releasably fit in the groove in the female member so as to be constricted by the female member and with the gap in the outer race being less than said predetermined length and in registry with said access hole; balls rollably positioned between said inner and outer races and being movable into and out of their positions between said races through the gap in the outer race and said access hole; and means for positioning in said access hole and projecting between the ends of the outer race for retaining the balls between the said inner and outer races and for limiting movement of the outer race circumferentially of the female member, said inner and outer races being thereby respectively in tension and compression when in position in said rotary joint whereby upon expansion and contraction of the male and female member of the joint under temperature changes, said races expand and contract but still remain in their constricted conditions in substantially the same radially spaced relation to each other to facilitate continued rollable movement of the balls between the races.

4. The bearing assembly of claim 3 wherein said projecting means in said access hole comprises a cap with a wall overlying the ends of the outer race, and with an end projecting between the outer race ends in spaced relation thereto whereby expansion and contraction of the female member and concomitant expansion and contraction of the outer race is accommodated.

5. The bearing assembly of claim 4 wherein the end of the cap projecting between said outer race ends is provided with a channel which constitutes a continuation of said outer race.

References Cited

UNITED STATES PATENTS

| 341,816 | 5/1886 | Parker | 308—216 X |
| 558,642 | 4/1896 | Fayol | 308—216 X |
| 926,966 | 7/1909 | Shirley | 308—216 |
| 1,965,729 | 7/1934 | Tessky | 308—216 |
| 2,741,826 | 4/1956 | Hall | 308—196 X |
| 2,759,243 | 8/1956 | Smith | 308—196 X |
| 2,935,357 | 5/1960 | Sutowski | 308—196 X |
| 3,230,023 | 1/1966 | Dahl et al. | 308—216 X |
| 3,264,006 | 8/1966 | Downs | 285—276 X |

FOREIGN PATENTS

| 342,614 | 10/1921 | Germany. |
| 359,373 | 10/1931 | Great Britain. |

CARL W. TOMLIN, *Primary Examiner.*

THOMAS F. CALLAGHAN, *Examiner.*